No. 779,794.

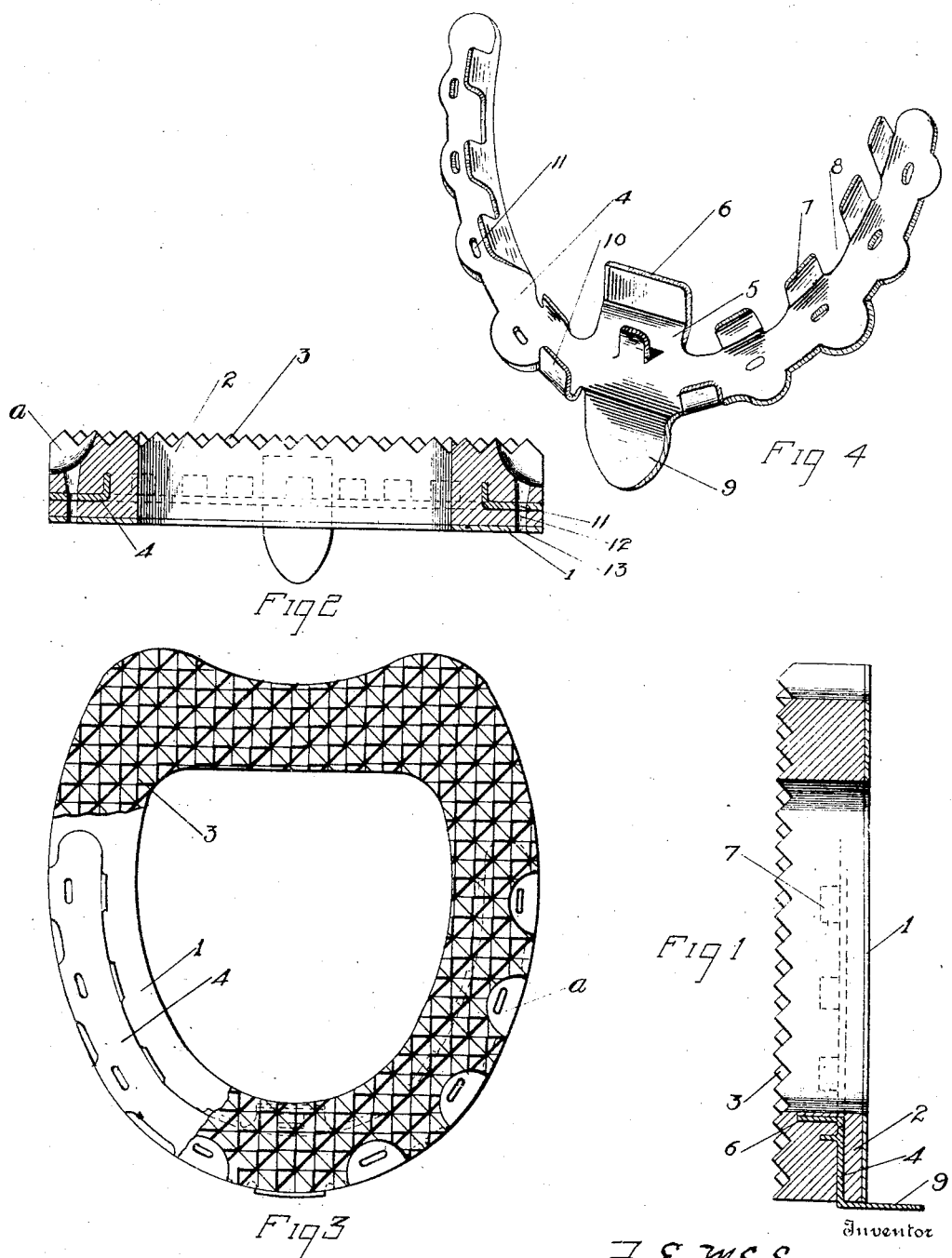

Patented January 10, 1905.

UNITED STATES PATENT OFFICE.

FREDERICK E. McEWEN, OF NEW YORK, N. Y., ASSIGNOR OF ONE-HALF TO FRANCIS M. MILLER, OF NEW YORK, N. Y.

SOFT-TREAD HORSESHOE.

SPECIFICATION forming part of Letters Patent No. 779,794, dated January 10, 1905.

Application filed March 18, 1904. Serial No. 198,791.

*To all whom it may concern:*

Be it known that I, FREDERICK E. MCEWEN, a citizen of the United States, residing at New York, in the county of New York and State of New York, have invented certain new and useful Improvements in Soft-Tread Horseshoes; and I do hereby declare the following to be a full, clear, and exact description of the invention, such as will enable others skilled in the art to which it appertains to make and use the same.

This invention relates to that class of horseshoes commonly known as "soft-tread" shoes; and it has for its principal object to simplify and cheapen the cost of production of this type of shoe and to render the same more efficient and durable in service.

Other objects will become apparent upon a complete disclosure of the invention.

The invention consists, essentially, of the novel construction and general arrangement of the several parts, as will be hereinafter particularly described, and briefly stated in the claim.

In the drawings, Figure 1 is a longitudinal sectional view of my improved horseshoe; Fig. 2, a transverse section of the same; Fig. 3, a plan view, a portion of the rubber tread being broken away to show the nailing-plate; and Fig. 4, a perspective view of the nailing-plate.

In the several views the numeral 1 indicates the base portion of my improved shoe, which is made of leather or similar material shaped to conform to the contour of the hoof and having preferably a closed heel, as shown in Figs. 1 and 3. Attached to the base portion, preferably by vulcanizing, is a rubber tread 2, having a corrugated surface 3 to prevent slipping. The rubber tread is of the same general contour as the leather base, and embedded in said tread is a metallic nailing-plate 4, preferably of steel. This nailing-plate is provided on its inner edge with a central projection 5, having a downwardly-turned lug 6, and on each side of the projection 5 is a plurality of downwardly-turned lugs 7, separated by recesses 8. The outer edge of the nailing-plate is provided with an upwardly-turned toe-clip 9, and on each side of said toe-clip is a downwardly-turned lug 10. On each side of the lug 10 is a plurality of uniformly-spaced nail-holes 11, corresponding and in alinement with similar holes 12 and 13 in the rubber tread and leather base, respectively, the holes 12 in the rubber tread being countersunk, as indicated by letter *a*, Figs. 2 and 3, to receive the heads of the nails.

In constructing my improved shoe the nailing-plate is so placed and embedded in the rubber tread that a layer of rubber will be interposed between the leather base and said nailing-plate, so as to provide for effectively securing the rubber tread to said base by vulcanizing or other means.

The nailing-plate forms an important feature of my invention, as by making it of a simple piece of metal and providing it with the lugs and recesses the liability to become loosened in service is reduced to a minimum, and beside the lugs serve to prevent the rubber from squeezing out.

Having thus fully described my invention, what I claim as new, and desire to secure by Letters Patent, is—

As an article of manufacture, a soft-tread horseshoe having a closed heel, and a single-piece nail-plate having a central downwardly-extending securing-lug, a plurality of smaller securing-lugs at each side thereof, a toe-clip on the outer edge, and a downwardly-extending lug on each side thereof.

In testimony whereof I affix my signature in the presence of two witnesses.

FREDERICK E. McEWEN.

Witnesses:
 MAURICE RUBENFE,
 BLOOMFIELD USHER.